(12) United States Patent
Wickersham et al.

(10) Patent No.: US 11,486,262 B2
(45) Date of Patent: Nov. 1, 2022

(54) DIFFUSER BLEED ASSEMBLY

(71) Applicant: General Electric Company, Schenectady, NY (US)

(72) Inventors: Andrew Wickersham, Liberty Township, OH (US); Michael A. Benjamin, Cincinnati, OH (US); Steven C. Vise, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/191,566

(22) Filed: Mar. 3, 2021

(65) Prior Publication Data

US 2022/0282627 A1 Sep. 8, 2022

(51) Int. Cl.
 F01D 9/02 (2006.01)
 F02C 6/08 (2006.01)

(52) U.S. Cl.
 CPC .................. F01D 9/02 (2013.01); F02C 6/08 (2013.01); F05D 2240/126 (2013.01); F05D 2260/963 (2013.01)

(58) Field of Classification Search
 CPC .............. F02C 6/08; F02C 9/18; F02C 9/52
 USPC .......... 60/785, 751, 782, 806, 795; 415/119, 415/115, 207, 914, 144
 See application file for complete search history.

(56) References Cited

U.S. PATENT DOCUMENTS

| | | | |
|---|---|---|---|
| 2,608,054 A | 8/1952 | Price | |
| 3,910,035 A * | 10/1975 | Juhasz | F23R 3/26 60/39.23 |
| 4,098,073 A * | 7/1978 | Adkins | F04D 29/681 60/39.5 |
| 5,697,208 A * | 12/1997 | Glezer | F01D 5/022 60/785 |
| 6,334,297 B1 * | 1/2002 | Dailey | F23R 3/04 60/785 |
| 6,588,195 B2 | 7/2003 | Negulescu | |
| 7,921,652 B2 | 4/2011 | Kirby | |
| 8,430,202 B1 * | 4/2013 | Mason | F01D 17/105 60/785 |
| 8,578,719 B2 | 11/2013 | Kirby | |
| 8,695,352 B2 | 4/2014 | Bohney et al. | |
| 9,920,643 B2 | 3/2018 | Manzoori et al. | |
| 10,513,984 B2 | 12/2019 | Kim et al. | |
| 2004/0244379 A1 * | 12/2004 | Walker | F01D 9/04 60/751 |
| 2010/0180573 A1 | 7/2010 | Ruston | |
| 2011/0179803 A1 * | 7/2011 | Berry | F02C 7/222 60/722 |

(Continued)

FOREIGN PATENT DOCUMENTS

CN 207962721 U 10/2018

*Primary Examiner* — Mickey H France
(74) *Attorney, Agent, or Firm* — Venable LLP; Elizabeth C. G. Gitlin; Michele V. Frank

(57) ABSTRACT

An engine may include an integrated diffuser-bleed baffle assembly, a diffuser, and a bleed port. The integrated diffuser-bleed baffle assembly fluidly coupled between the diffuser and the bleed port. The integrated diffuser-bleed baffle assembly is configured to flow a boundary layer flow from the diffuser to the bleed port. A baffle hole may be included in the integrated diffuser-bleed baffle assembly such that the assembly may function to dampen acoustic instabilities in the engine.

18 Claims, 3 Drawing Sheets

(56) References Cited

U.S. PATENT DOCUMENTS

| | | | |
|---|---|---|---|
| 2011/0314828 A1* | 12/2011 | Bil | F04D 29/444 |
| | | | 60/751 |
| 2013/0042627 A1* | 2/2013 | Gerendas | F23M 20/005 |
| | | | 60/725 |
| 2017/0058780 A1* | 3/2017 | Kim | F02C 9/18 |
| 2017/0191484 A1* | 7/2017 | Klasing | F04D 29/542 |
| 2020/0355121 A1* | 11/2020 | O'Meallie | F02C 7/36 |

* cited by examiner

DIFFUSER BLEED ASSEMBLY

TECHNICAL FIELD

The present disclosure relates to a bleed assembly for a diffuser. More particularly, the present disclosure relates to an integrated diffuser-baffle bleed assembly.

BACKGROUND

Current gas turbine engines include bleed ports that pull air from a cavity near the diffuser to use elsewhere in the engine or elsewhere in the aircraft. As technology in the aircraft and/or in the engine require more air, there becomes a larger bleed demand which results in an increasing size of the bleed port to accommodate larger flows of air.

BRIEF SUMMARY

According to an embodiment, an engine may comprise a diffuser; a bleed port; and an integrated diffuser-bleed baffle assembly fluidly coupled between the diffuser and the bleed port, wherein the integrated diffuser-bleed baffle assembly is configured to flow a boundary layer flow from the diffuser to the bleed port.

According to an embodiment, An integrated diffuser-bleed baffle assembly for a gas turbine engine, comprising: a body having an inlet at a first end and an outlet at a second end; a passage extending within the body from the inlet to the outlet; and wherein the body and the passage gradually increase in width from the first end to the second end, and wherein the passage is configured to bleed boundary layer flow from a diffuser to a bleed port.

According to an embodiment, a method for bleeding air flow from a diffuser in a gas turbine engine may comprise providing a flow through the diffuser, the flow having a main flow and a boundary layer flow; bleeding the boundary layer flow directly from a diffuser outlet to a bleed port; and dampening an acoustic instability in a cavity downstream of the diffuser.

Additional features, advantages, and embodiments of the present disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

Current gas turbine engines include a large bleed port that may result in added weight and length to the engine which may reduce overall efficiency of the engine. The bleed assembly of the present disclosure allows for the bleed port to be reduced in size, thus reducing the weight of the engine, the length of the engine and increasing efficiency of the engine while achieve a desired flow through the engine.

The present disclosure describes a bleed assembly for a diffuser. The bleed assembly may include a baffle coupled between the diffuser outlet and the bleed port. The baffle may include an internal passage that allows a boundary layer bleed from the diffuser to flow through the baffle and exit the bleed port. The baffle may further include a baffle hole extending transverse to the internal passage. The baffle hole may allow for the baffle to function as a damper.

The present disclosure thus describes an integrated diffuser-baffle bleed assembly that allows for pulling the boundary layer bleed directly from an interior wall of the diffuser. This may allow for a shorter diffuser with a higher expansion ratio while avoiding flow separation. This may also allow for the bleed port to be reduced in size, the diffuser to be shortened, the external housing to which the bleed port is coupled to be shortened, or any combination thereof. Such reductions in size and weight of the components may reduce the size and weight of the engine, as compared to engines without the bleed assembly of the present disclosure, thus improving the efficiency of the engine. A shorter diffuser (as compared to system without the bleed assembly of the present disclosure) may be more efficient due to have a larger area ratio in a shorter axial span.

Figure 1:
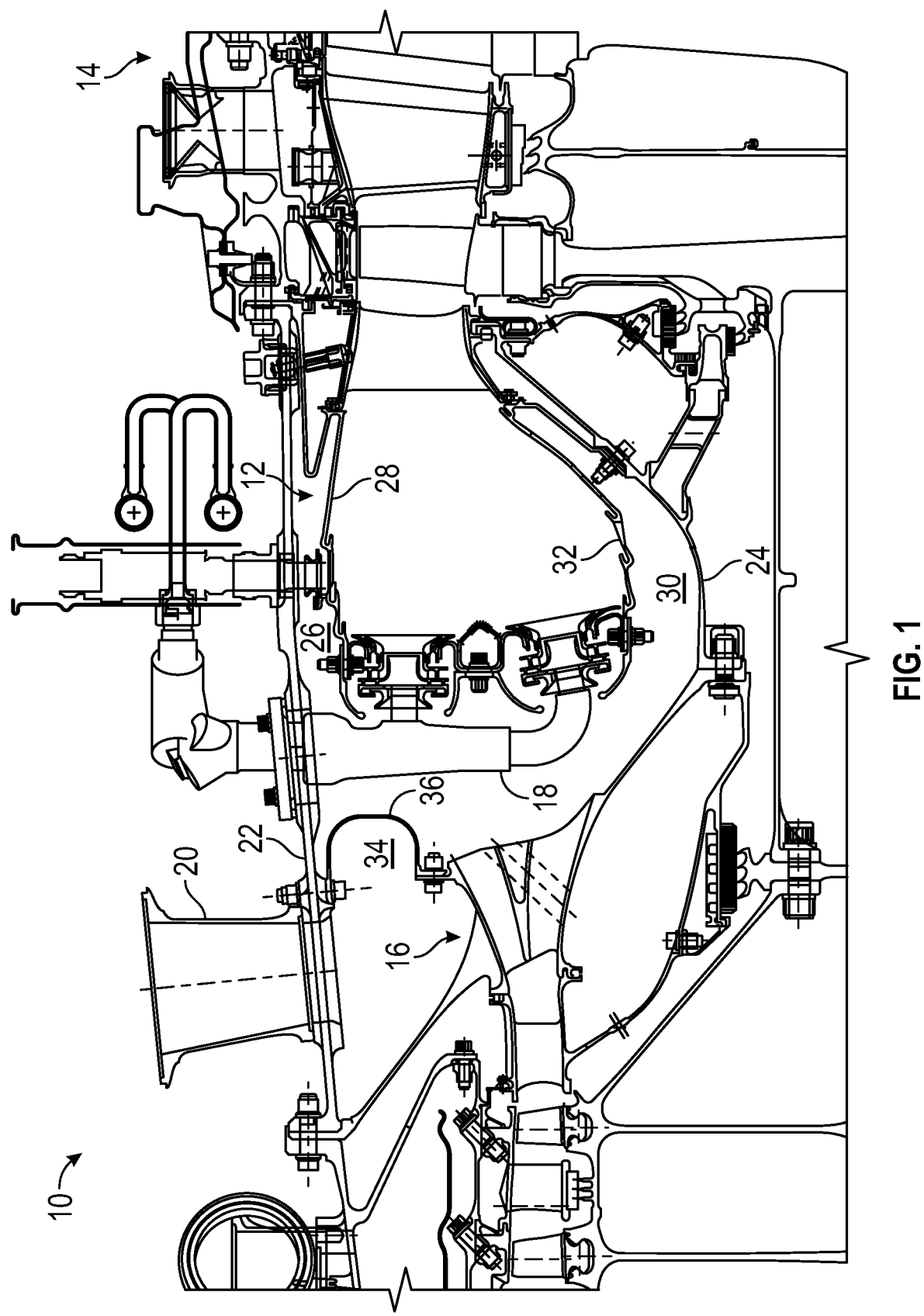
FIG. 1 shows a schematic, cross-section view of a portion of a gas turbine engine, according to an embodiment of the present disclosure.

FIG. 1 shows a schematic, cross-section view of a section 10 of an engine, such as, for example, a gas turbine engine. The section 10 may include a combustion section 12 that generates the combustion gases discharged into the turbine section 14. A diffuser 16 may be positioned upstream of the combustion section 12. The diffuser 16 may receive an airflow from the compressor section (not shown) of the engine and may provide the flow of compressed air to the combustion section 12. The section 10 may include a fuel nozzle 18 and a bleed port 20. The section 10 may include an outer casing 22 and an inner casing 24. The outer casing 22 may define an outer passage 26 between the outer casing 22 and an outer liner 28 of the combustion chamber. The inner casing 24 may define an inner passage 30 between the inner casing 24 and an inner liner 32 of the combustion chamber. A cavity 34 may exist between the diffuser 16 and the combustion section 12. A baffle 36 may exist in the cavity 34. The baffle 36 may be present to dampen the acoustic instability and/or help aerodynamically redistribute a high bleed pull caused by the large bleed port 20 which may cause flow nonuniformity. Flow nonuniformity may occur when the flow through the cavity 34 is sufficiently high locally, which may result in uneven circumferential flow distribution that may affect the engine performance.

Figure 2:
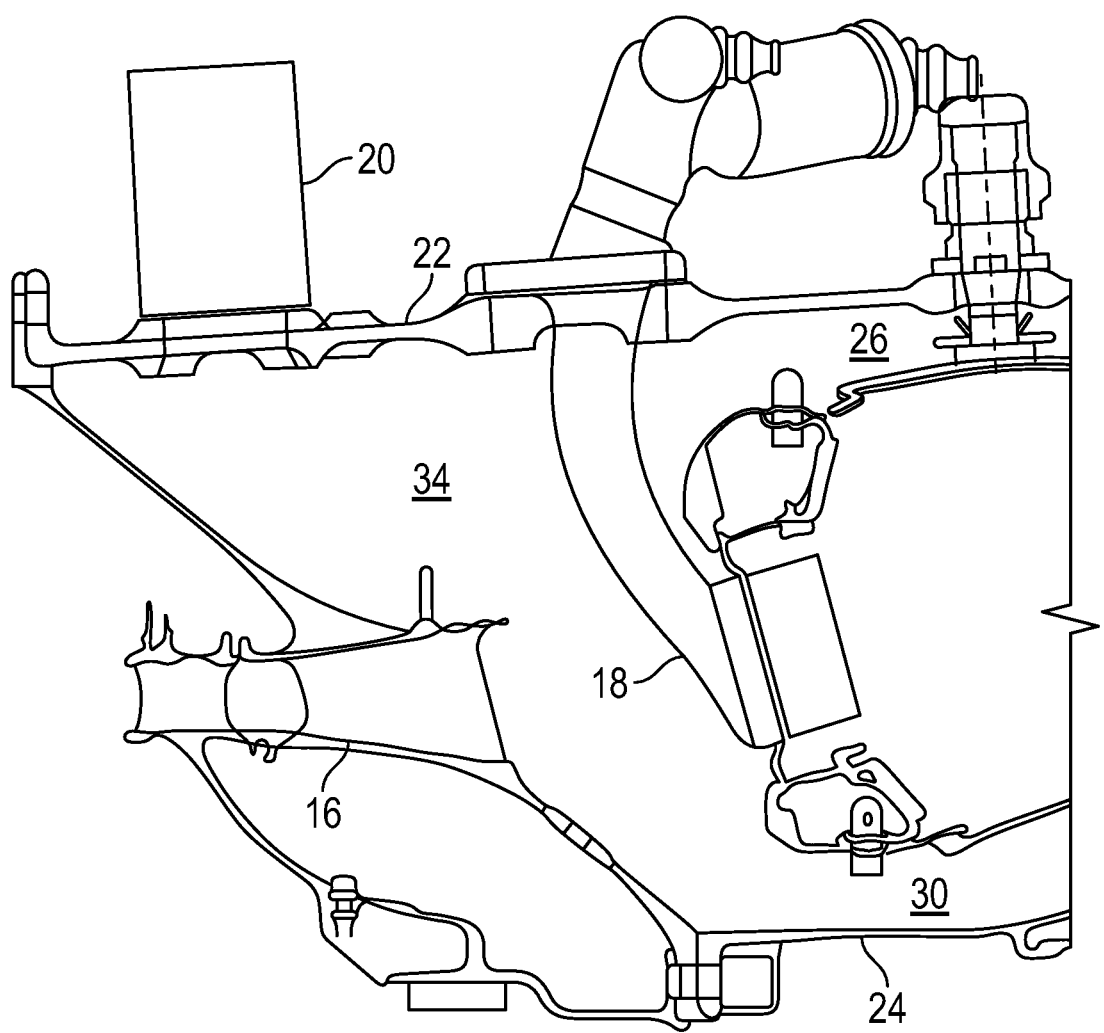
FIG. 2 shows a close-up, schematic, cross-section view of a diffuser and fuel nozzle of a gas turbine engine, according to an embodiment of the present disclosure.

Referring to FIG. 2, a schematic, cross-section view of a section of an engine is shown. The section shown in FIG. 2 may not include a baffle or a bleed assembly. The section may include a diffuser 16 and a fuel nozzle 18 as described with respect to FIG. 1. A cavity 34 may exist within the section between the diffuser 16 and the fuel nozzle 18. The cavity 34 may be bounded by the outer casing 22 and the inner casing 24. The cavity 34 may be fluidly coupled with the outer passage 26 and the inner passage 30.

With continued reference to FIG. 2, a bleed port 20 may be included in the outer casing 22. The bleed port 20 may be provided to allow for air to be bled or diverted off of the combustor diffuser nozzle, also referred to as diffuser 16, and directed elsewhere within the engine or exterior to the engine. The bleed port 20 is sized and dimensioned based on the air need within the engine and for other customer needs.

As technology needs within the industry increasingly require air, the size of the bleed port 20 continually enlarges to accommodate the increased air quantity required. Such an increase in size may lead to increases in weight of the engine and thus may decrease the efficiency of the engine. Furthermore, as the bleed port 20 increases in size, too much air may be bled from the engine such that the combustor may be locally starved of air, resulting in inefficient operation of the engine. As the fuel to air ratio increases, the local flame temperature caused by this local starvation of air may increase, which may in turn result in damage to the hardware within the engine.

In operation, the air may flow through the diffuser 16 into the cavity 34 and through the bleed port 20. That is, the air exiting through the bleed port 20 may not be pulled directly from the diffuser 16, but rather from the cavity 34. The air exiting the diffuser 16 may have high pressure. To minimize diffuser length and subsequent weight, the diffuser length is minimized. If the diffuser area ratio is expanded too quickly, flow separation may occur (e.g., the boundary layer detaching from the walls of the diffuser) resulting in high diffuser loss. The local, high, direct path of the air flow from the diffuser outlet to the bleed port 20 may also lead to starvation of the combustor and reduce the efficiency and/or operability of the engine.

Accordingly, in an engine where a bleed assembly is omitted, such as FIG. 2, the weight, length, and size of components may be larger. This may be due to multiple bleed ports, spaced circumferentially around the combustor, requiring multiple bleed pipes and manifolds in the bypass region of the engine. Increased piping results in more engine weight and the engine may be more inefficient, and the risk of damage to the hardware in the engine may be greater, as compared to an engine including a bleed assembly, such as will be described with respect to FIG. 3.

Figure 3:
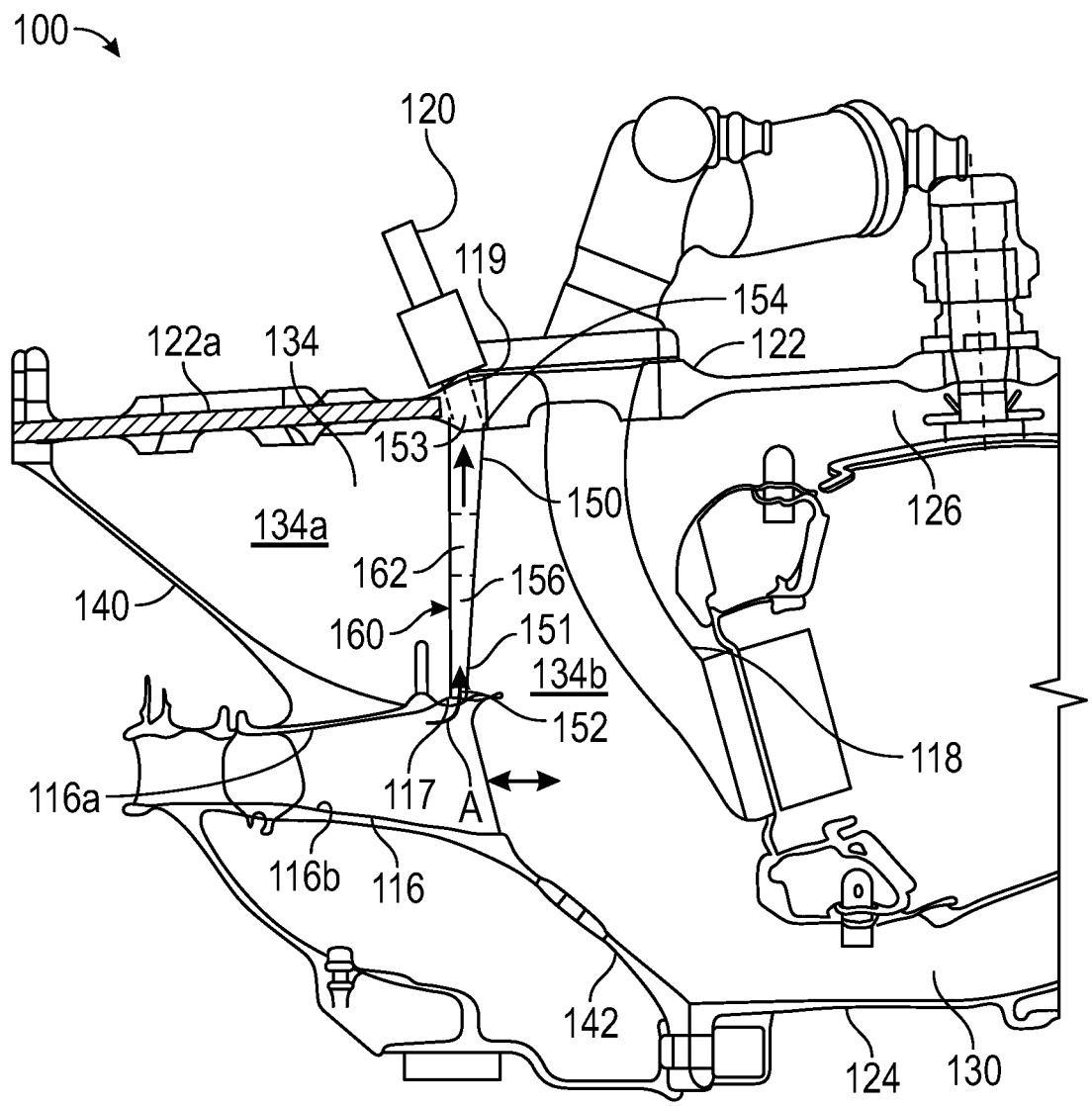
FIG. 3 shows a close-up, schematic, cross-section view of a diffuser and fuel nozzle of a gas turbine engine, the diffuser section including a baffle, according to an embodiment of the present disclosure.

Referring to FIG. 3, a schematic, cross-section view of a section 100 of an engine is shown. The section 100 may include a diffuser 116 and a fuel nozzle 118. A cavity 134 may exist within the section between the diffuser 116 and the fuel nozzle 118. The cavity 134 may divided into two sections, a first cavity portion 134a and a second cavity portion 134b. The first cavity portion 134a may be bounded by the outer casing 122, an upper diffuser support 140, and a bleed assembly 150. The second cavity portion 134b may be bounded by a lower diffuser support 142 and the bleed assembly 150. The second cavity portion 134b may be fluidly coupled to the first cavity portion 134a, the outer passage 126 and the inner passage 130.

With continued reference to FIG. 3, the bleed assembly 150 may include an inlet 151 at a first end 152 coupled to an outlet 117 of the diffuser 116. The bleed assembly 150 may include an outlet 153 at a second end 154 coupled to an inlet 119 of a bleed port 120. The bleed assembly 150 may include a passage 156 extending within the body of the bleed assembly 150. The passage 156 may be a through passage coupling the diffuser outlet 117 to the bleed port inlet 119. The outlet 153 may penetrate the outer casing 122 to couple to the inlet 119 of the bleed port 120.

The bleed assembly 150 may allow for a boundary layer flow A to flow from the inner wall 116a of the diffuser to the inlet 151 of the bleed assembly 150. Allowing the flow A to maintain proximity to the inner wall 116a avoids flow separation, thus avoiding high pressure drops and the high diffuser loss associated with the assembly of FIG. 2. The inlet 151 may be located circumferentially as uniform as possible around the outlet 117 of the diffuser 116. That is, the bleed assembly 150 with the inlet 151 may be generally annular in shape and placed radially around the outlet 117 of the diffuser 116. The inlet 151 may be as far axially down the diffuser 116 toward the cavity 134 as possible. This may allow the inlet 151 to be close to and adjacent with the outlet 117.

The bleed assembly 150 may include an annular body. The annular body may have a central opening for attaching around the outer surface of the diffuser 16. The passage 156 may be a plurality of passages that extend radially about the central opening through the annular body. For example, the passages 156 may be like spokes extending from an inner surface of the body (attached to the diffuser) to an outer surface (attached to the bleed port 120). The passages 156 may be separate and not fluidly coupled. Alternatively, the passages 156 may be fluidly coupled to one another.

The bleed assembly 150 may be formed as a baffle 150. That is, the bleed assembly 150 may operate as a baffle to dampen acoustic instabilities within the cavity 134. In the example depicted in FIG. 3, the bleed assembly 150 is an integrated diffuser-baffle bleed assembly 150. The integrated diffuser-baffle bleed assembly 150 operates as both a bleed assembly, as previously discussed, and as a baffle. The integrated diffuser-baffle bleed assembly 150 may include a baffle body 160. The baffle body 160 may house the passage 156. The baffle body 160 may increase in width from the inlet 151 to the outlet 153. The gradual increase in dimension of the body 160 may also include a gradual increase in dimension of the passage 156 from the inlet 151 to the outlet 153.

The baffle body 160 may also include an opening, such as a baffle hole 162. The baffle hole 162 in combination with the cavity 134a may operate as a Helmholtz cavity to dampen acoustic instabilities in the engine. The baffle hole 162 may operate as the neck of the Helmholtz cavity. The hole 162 and the cavity 134a may be sized to target a particular frequency of instability for dampening. Although a single baffle hole 162 is shown, more may be provided or the baffle hole 162 may be omitted and the bleed assembly 150 would then operate as a bleed assembly only. The baffle hole 162 may be transverse to the passage 156, but may not intersect with the passage 156. For example, the baffle hole 162 may be offset from the passage 156 such that the hole 162 and the passage 156 are not fluidly coupled. In some examples, the passage 156 may be a series of radially extending separate passages spaced apart on the annular body 160. The baffle hole 162 may be placed between two adjacent passages 156.

The integrated diffuser-baffle bleed assembly 150 may have the baffle body 160 integrated with the diffuser 116. The body 160 may be integrally and unitarily formed with the diffuser 116. Alternatively, the body 160 may be coupled thereto with a connection type, such as a fastener, weld, adhesive, etc.

By locating the inlet 151 of the bleed assembly 150 at the outlet 117 of the diffuser 116, the boundary layer is maintained against the wall which allows the diffuser 116 length to be shortened as compared to a diffuser 16 without a bleed assembly 150. In addition to reducing the length of the diffuser 116, the bleed assembly 150 may allow the size of the bleed port 120 to be reduced as compared to a bleed port 20 without a bleed assembly 150. A smaller bleed port 120 and shortened diffuser 116 may also allow for the section 122a of the outer casing 122 to be reduced in length as compared to the outer casing 22 without a bleed assembly. Such reduction in size and dimension of the components results in an overall length of the engine and an overall weight of the engine being lower as compared to an engine without an integrated diffuser-baffle bleed assembly. Such lower weight of the engine, where an average weight of components is about 30 lbs./inch, is important to the operation of the engine. Lower weight within the engine results in greater efficiency of the engine.

In operation, boundary layer bleed flow A may enter the inlet 151 of the passage 156 and pass through the passage 156 to the outlet 153 and into the inlet 119 of the bleed port 120. From the bleed port 120, the air may be used elsewhere in the engine or aircraft as needed.

Although described as including a Helmholtz cavity, the integrated diffuser-baffle bleed assembly may function as a bleed assembly only.

Although described with respect to boundary layer flow A at the inner wall 116a, the integrated diffuser-baffle bleed assembly of the present disclosure may be located in the cavity 134b such that boundary layer flow along the inner wall 116b may be bleed off at the inner casing 124 to be used in the inducer and/or for engine cooling.

Accordingly, the integrated diffuser-baffle bleed assembly of the present disclosure may allow for diffuser bleed flow being pulled from the diffuser for other uses within the engine and/or aircraft. The present disclosure may incorporate circumferential boundary layer suction at the diffuser outer wall, routing flow through the baffle. The baffle of the present disclosure may be formed with additive manufacturing. The passages and the baffle holes (if present) may be printed into the body of the assembly. The integrated combustor diffuser nozzle case bleed manifold may allow for individual large bleed pull to be discretized into smaller bleed pulls through an integrated manifold allowing more circumferentially uniform bleed pulls and facilitating more bleed couples (e.g., to customer, reverse bleed systems, transient bleed valves, etc.). That is, the single bleed port 20 of FIG. 2 may be replaced by a smaller, circumferential arrangement of a plurality of bleed ports 120 of FIG. 3.

Accordingly, the integrated diffuser-baffle bleed assembly of the present disclosure presents an integrated baffle on the outer diffuser to bleed flows from the diffuser for use elsewhere (e.g., flows directed to customer, cooling and transient bleed valve). The integrated diffuser-baffle bleed assembly of the present disclosure allows for the low momentum fluid at the boundary layer in the diffuser to be extracted. The extraction of the bleed flow allows for a greater expansion ratio on the diffuser in a shorter length, thus shortening the length of the diffuser while maintaining larger area ratio with higher pressure recoveries.

The integrated diffuser-baffle bleed assembly of the present disclosure allows for a shorter, higher area ratio diffuser by using the baffle to bleed the boundary layer. This may alleviate blockage of large bleed pipes within the bypass section of the engine or outside of the combustor case.

The integrated diffuser-baffle bleed assembly of the present disclosure allows for a shorter overall diffuser length (with respect to a diffuser without a baffle). This may result in less overall length of the combustor diffuser nozzle module and thus less weight, as compared to a system without the integrated baffle of the present disclosure. Accordingly, the integrated diffuser-baffle bleed assembly of the present disclosure allows for saving and reducing of weight and space within the engine.

The integrated diffuser-baffle bleed assembly of the present disclosure may allow for a larger area ratio in the diffuser which may in turn equate to better pressure recoveries. The baffle of the present disclosure may allow for smaller combustor diffuser nozzle case penetrations and allow potential for easier routing of tubing. The integrated diffuser-baffle bleed assembly of the present disclosure may allow for simplification of outer radial mounting and may alleviate space requirements within the engine where increasing space demand is requested (e.g., for the fuel nozzle, outer combustor supports, bleed ports, mechanical mounting, etc.).

As mentioned, the integrated diffuser-baffle bleed assembly of the present disclosure may allow for increased engine efficiency as compared to an engine without the benefit of the present disclosure. Weight and performance are major drivers of modern engines. The present disclosure enables a bleed system that may have a higher performance: increased pressure recovery in the diffuser, increased back flow margin, and more circumferential bleed pull rather than a single bleed port that can affect the combustor's pattern factor. Implementation of the present disclosure may enable a decrease in diffuser length and potentially a decrease in combustor diffuser nozzle module length. The present disclosure may allow for a decrease in total engine weight without negatively affecting engine performance.

Further aspects of the present disclosure are provided by the subject matter of the following clauses.

1. An engine comprising: a diffuser; a bleed port; and an integrated diffuser-bleed baffle assembly fluidly coupled between the diffuser and the bleed port, wherein the integrated diffuser-bleed baffle assembly is configured to flow a boundary layer flow from the diffuser to the bleed port.

2. The engine of any preceding clause, wherein the integrated diffuser-bleed baffle assembly comprises a passage extending from an inlet to an outlet.

3. The engine of any preceding clause, wherein the boundary layer flow is configured to flow from the diffuser to the bleed port through the passage.

4. The engine of any preceding clause, wherein the inlet is located at an outlet of the diffuser.

5. The engine of any preceding clause, wherein the integrated diffuser-bleed baffle assembly and the passage gradually increase in dimension from the inlet to the outlet.

6. The engine of any preceding clause, further comprising a baffle hole extending transversely to the passage through the integrated diffuser-bleed baffle assembly.

7. The engine of any preceding clause, wherein the integrated diffuser-bleed baffle assembly is configured to flow air from the diffuser to the bleed port and function as a Helmholtz cavity.

8. The engine of any preceding clause, wherein the integrated diffuser-bleed baffle assembly is configured to flow air from an upper inner wall to the bleed portion, from a lower inner wall to an inner casing, or both.

9. An integrated diffuser-bleed baffle assembly for a gas turbine engine, comprising: a body having an inlet at a first end and an outlet at a second end; a passage extending within the body from the inlet to the outlet; and wherein the body and the passage gradually increase in width from the first end to the second end, an wherein the passage is configured to bleed boundary layer flow from a diffuser to a bleed port.

10. The integrated diffuser-bleed baffle assembly of any preceding clause, further comprising a baffle hole extending through the body in a direction transverse to the passage.

11. The integrated diffuser-bleed baffle assembly of any preceding clause, wherein the baffle hole is configured to function as a neck of a Helmholtz cavity.

12. The integrated diffuser-bleed baffle assembly of any preceding clause, wherein the body is an annular body.

13. The integrated diffuser-bleed baffle assembly of any preceding clause, wherein the annular body comprises central opening configured to be fitted around the diffuser.

14. The integrated diffuser-bleed baffle assembly of any preceding clause, wherein the passage is a plurality of passages extending in a radial direction around a central axis of the annular body.

15. The integrated diffuser-bleed baffle assembly of any preceding clause, further comprising one or more baffle holes, each of the one or more baffles holes located transverse to the plurality of passages and between adjacent passages of the plurality of passages.

16. A method for bleeding air flow from a diffuser in a gas turbine engine, the method comprising: providing a flow through the diffuser, the flow having a main flow and a boundary layer flow; bleeding the boundary layer flow directly from a diffuser outlet to a bleed port; and dampening an acoustic instability in a cavity downstream of the diffuser.

17. The method of any preceding clause, wherein the bleeding occurs in a passage coupled directly between the diffuser outlet and the bleed port.

18. The method of any preceding clause, further comprising providing an integrated diffuser-bleed baffle assembly, the assembly configured to bleed the boundary layer flow directly from the diffuser outlet to the bleed port and to operate as a Helmholtz cavity to dampen the acoustic instability in the cavity.

19. The method of any preceding clause, wherein the integrated diffuser-bleed baffle assembly comprises a baffle hole configured to function as a neck of the Helmholtz cavity.

20. The method of any preceding clause, further comprising fitting the integrated diffuser-bleed baffle assembly around an outer surface of the diffuser outlet.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. An engine comprising:
a diffuser;
a bleed port; and
an integrated diffuser-bleed baffle assembly fluidly coupled between the diffuser and the bleed port, and
wherein the integrated diffuser-bleed baffle assembly is configured to flow a boundary layer air flow from the diffuser to the bleed port and function as a Helmholtz cavity.

2. The engine of claim 1, wherein the integrated diffuser-bleed baffle assembly comprises a passage extending from an inlet to an outlet.

3. The engine of claim 2, wherein the boundary layer air flow is configured to flow from the diffuser to the bleed port through the passage.

4. The engine of claim 2, wherein the inlet is located at an outlet of the diffuser.

5. The engine of claim 2, wherein the integrated diffuser-bleed baffle assembly and the passage gradually increase in dimension from the inlet to the outlet.

6. The engine of claim 2, further comprising a baffle hole extending transversely to the passage through the integrated diffuser-bleed baffle assembly.

7. The engine of claim 1, wherein the integrated diffuser-bleed baffle assembly is configured to flow air from an upper inner wall to the bleed port, from a lower inner wall to an inner casing, or both.

8. An integrated diffuser-bleed baffle assembly for a gas turbine engine, comprising:
a body having an inlet at a first end and an outlet at a second end;
a passage extending within the body from the inlet to the outlet; and
a baffle hole extending through the body in a direction transverse to the passage,
wherein the body and the passage gradually increase in width from the first end to the second end, and
wherein the passage is configured to bleed boundary layer flow from a diffuser to a bleed port.

9. The integrated diffuser-bleed baffle assembly of claim 8, wherein the baffle hole is configured to function as a neck of a Helmholtz cavity.

10. The integrated diffuser-bleed baffle assembly of claim 8, wherein the body is an annular body.

11. The integrated diffuser-bleed baffle assembly of claim 10, wherein the annular body comprises a central opening configured to be fitted around the diffuser.

12. The integrated diffuser-bleed baffle assembly of claim 10, wherein the passage is a plurality of passages extending in a radial direction around a central axis of the annular body.

13. The integrated diffuser-bleed baffle assembly of claim 12, further comprising one or more baffle holes, each of the one or more baffles holes located transverse to the plurality of passages and between adjacent passages of the plurality of passages.

14. A method for bleeding air flow from a diffuser in a gas turbine engine, the method comprising:
providing a flow through the diffuser, the flow having a main flow and a boundary layer flow;
bleeding the boundary layer flow directly from a diffuser outlet to a bleed port; and
dampening an acoustic instability, with a Helmholtz cavity, in a cavity downstream of the diffuser.

15. The method of claim 14, wherein the bleeding occurs in a passage coupled directly between the diffuser outlet and the bleed port.

16. The method of claim 14, further comprising providing an integrated diffuser-bleed baffle assembly, the integrated diffuser-bleed baffle assembly configured to bleed the boundary layer flow directly from the diffuser outlet to the bleed port.

17. The method of claim 16, wherein the integrated diffuser-bleed baffle assembly comprises a baffle hole configured to function as a neck of the Helmholtz cavity.

18. The method of claim 16, further comprising fitting the integrated diffuser-bleed baffle assembly around an outer surface of the diffuser outlet.

* * * * *